US008324569B2

(12) United States Patent
Kajihara

(10) Patent No.: US 8,324,569 B2
(45) **Date of Patent: *Dec. 4, 2012**

(54) MASS SPECTROMETER

(75) Inventor: Shigeki Kajihara, Uji (JP)

(73) Assignee: Shimadzu Corporation, Kyoto (JP)

( * ) Notice: Subject to any disclaimer, the term of this patent is extended or adjusted under 35 U.S.C. 154(b) by 1 day.

This patent is subject to a terminal disclaimer.

(21) Appl. No.: 13/001,605

(22) PCT Filed: Jul. 3, 2008

(86) PCT No.: PCT/JP2008/001760

§ 371 (c)(1), (2), (4) Date: Jan. 25, 2011

(87) PCT Pub. No.: WO2010/001439

PCT Pub. Date: Jan. 7, 2010

(65) Prior Publication Data

US 2011/0127425 A1 Jun. 2, 2011

(51) Int. Cl.
*H01J 49/00* (2006.01)
*B01D 59/44* (2006.01)

(52) U.S. Cl. .......... 250/288; 250/281; 250/282; 702/28; 702/23

(58) Field of Classification Search .................. 250/288, 250/281, 282; 702/28, 23
See application file for complete search history.

(56) References Cited

U.S. PATENT DOCUMENTS

| | | | | |
|---|---|---|---|---|
| 5,808,300 | A | 9/1998 | Caprioli | 250/288 |
| 7,105,354 | B1 * | 9/2006 | Shimoide et al. | 436/164 |
| 7,501,620 | B2 | 3/2009 | Ogawa et al. | 250/281 |
| 7,586,091 | B2 * | 9/2009 | Takahashi et al. | 250/288 |
| 8,119,982 | B2 * | 2/2012 | Kajihara | 250/282 |
| 2007/0045527 | A1 | 3/2007 | Ogawa et al. | 250/281 |
| 2007/0069122 | A1 | 3/2007 | Augustin et al. | 250/288 |

FOREIGN PATENT DOCUMENTS

| | | |
|---|---|---|
| JP | 2006-284509 | 10/2006 |
| JP | 2006-337371 | 12/2006 |

(Continued)

OTHER PUBLICATIONS

Kiyoshi Ogawa et al., "Research and Development of Mass Microscope", Shimadzu Corporation, Mar. 31, 2006, vol. 62, Nos. 3-4, pp. 125-135.

(Continued)

*Primary Examiner* — Nikita Wells
(74) *Attorney, Agent, or Firm* — DLA Piper LLP (US)

(57) ABSTRACT

An MS analysis is performed for each micro area within a specified mass analysis area on a sample. Based on the data obtained by this analysis, a distribution image of a specified m/z ratio of m/z range is created and displayed on a display screen (S10-S14). When an operator selects a substance of interest on the displayed image and indicates its m/z (S15), one or more micro areas in which the MS spectrum intensity at the specified m/z is equal to or higher than a threshold are extracted, and an MS/MS analysis using the m/z of the substance of interest as the precursor is performed on the extracted micro areas (S26 and S27). An average MS/MS spectrum is calculated from the MS/MS spectrum data obtained for those micro areas (S28), and the substance of interest is identified based on the information relating to the peaks appearing on the average MS/MS spectrum (S19).

6 Claims, 6 Drawing Sheets

FOREIGN PATENT DOCUMENTS

| | | | |
|---|---|---|---|
| JP | 2007-066533 | | 3/2007 |
| WO | WO 2007/020862 | A1 | 2/2007 |

OTHER PUBLICATIONS

Yasuhide Naito, "Mass Microprobe Aimed at Biological Samples", J. Mass Spectrum, Soc. Jpn. vol. 53, No. 3, 2005.

"Msimaging BioMap", Ms imaging, Search Jul. 3, 2008, http://www.maldi-msi.org/index.php?option=com_content&task=view&id=14&ltemid=32.

Translation of International Preliminary Report on Patentability and Written Opinion of the International Searching Authority.

* cited by examiner

MASS SPECTROMETER

CROSS-REFERENCE TO THE RELATED APPLICATIONS

This application is a national stage of international application No. PCT/JP2008/001760, filed on Jul. 3, 2008, the entire contents of which are incorporated herein by reference.

TECHNICAL FIELD

The present invention relates to a mass spectrometer for performing a mass analysis on each micro area included in a two-dimensional area on a sample and for analyzing and processing the obtained data More specifically, it relates to a mass spectrometer capable of an MS/MS analysis in which a specific ion is dissociated into one or more product ions and subjected to mass analysis.

BACKGROUND ART

In recent years, structural and functional analyses of proteins in living tissues have been rapidly promoted as post-genome research. As one method for such structural and functional analyses of proteins (proteome analysis), the methods that involve using a mass spectrometer for the expression analysis or primary structure analysis of a protein have been widely used in recent years. One of these commonly known methods uses a mass spectrometer capable of $MS^n$ analysis ($n \geqq 2$) including the operations of selecting and dissociating a specific ion. According to this method, the amino acid sequence of a protein is determined as follows.

First, a protein of interest is digested with an appropriate enzyme into a mixture of peptide fragments, and this peptide mixture is subjected to mass analysis. The elements constituting those peptides include stable isotopes having different masses. Therefore, in the aforementioned mass analysis, even a group of peptides consisting of the same amino acid sequence produce a plurality of peaks having different m/z values due to their difference in isotope composition. These peaks include a peak corresponding to the “main” ion, which consists of only the isotope having the highest natural abundance ratio, and one or more peaks corresponding to the “isotope” ions, which contain an isotope in addition to the most abundant isotope. When these ions are monovalent, they form an “isotope peak group”, i.e. a group that consists of a plurality of peaks arranged at intervals of one Da to several Da.

Subsequently, among a set of mass spectrum data of the aforementioned peptide mixture, one isotope peak group originating from one peptide is selected as precursor ions, and a mass analysis of the ions (product ions) obtained by dissociating these precursor ions (i.e. an MS/MS analysis) is performed. By searching a database for the mass-spectrum pattern of the obtained product ions or the mass-spectrum pattern of the precursor ions, it is possible to determine the amino acid sequence of the peptide being examined and identify the protein concerned (for example, refer to Patent Document 1).

The previously described protein identification method basically assumes that the sample is prepared by extracting a protein from a cell or other living tissues and then purifying and separating the protein. However, in the field of biochemistry or medicine, there are extremely strong demands for obtaining information about the two-dimensional distribution of proteins inside the cell in a living organism without destroying the cell whenever possible. To meet such demands, intensive efforts have been made on the development of a mass microscope (which is also referred to as an imaging mass spectrometer), which is capable of functioning both as a microscope and as a mass spectrometer. Mass microscopes can obtain distribution information (or a mapping image) of a substance within a two-dimensional area on a sample which is set, for example, on a preparation. Several configurations have been proposed to obtain mass-spectrum data for each micro area within a two-dimensional area on a sample in the mass microscope.

For example, in mass spectrometers disclosed in Patent Document 2, Patent Document 3 and Non-Patent Document 1, the irradiation point of a laser beam or particle beam for ionizing a sample is sequentially moved on the sample, and the ions generated from the irradiation point are individually detected for each m/z value every time the irradiation point is changed. In a mass spectrometer disclosed in Non-Patent Document 2, ions are almost simultaneously generated in a two-dimensional form so that they reflect the two-dimensional distribution of a substance on the sample. Then, those ions are separated for each m/z value by a time-of-flight mass separator and detected by a two-dimensional detector.

In any of the aforementioned configurations, in order to obtain a mapping image of a substance present within a two-dimensional area on a sample, it is necessary to analyze and process mass-spectrum data obtained for each micro area within the two-dimensional area to identify a substance (typically, a protein) present within each micro area. In the case of the mass spectrometer capable of MS/MS analysis, a set of mass-spectrum data obtained as a result of a mass analysis without dissociating an ion is analyzed and processed to determine an ion to be selected as a precursor, after which an MS/MS analysis is performed for each micro area with an appropriate precursor selected for the micro area and a set of MS/MS spectrum data obtained by the MS/MS analysis is analyzed and processed to identify the substance present within the micro area.

As a display form for showing a result based on the mass-spectrum data or MS/MS spectrum data obtained for each of the micro areas in the previously described manner, the following two examples are commonly known (for example, refer to Non-Patent Document 3).

(A) A mass spectrum of a measurement point (to be exact, a micro area that has an extremely small area and can be regarded as a point) on the sample or an average mass spectrum obtained by averaging mass spectrums of a plurality of points is displayed on a screen. An operator visually checks the mass spectrum and specifies an m/z range to be observed. Then, a mapping image is created on the display screen, on which the spectrum intensity value of the specified m/z range at each measurement point within a two-dimensional area on the sample is shown by a specific color pattern.

(B) On an optical image of a sample surface or a mapping image showing a two-dimensional distribution of a specific m/z value (or m/z range), an operator sets an ROI (region of interest) frame of an arbitrary shape to specify a portion to be observed. Then, the average of the mass spectrums of a plurality of measurement points included in the range surrounded by the ROI frame is calculated, and the thereby created average mass spectrum is drawn on the display screen.

The technique (A) provides information about the m/z value of a substance that is spatially localized on a sample. Therefore, for example, it is possible to know the m/z value of a substance that is not present in the nose or chin but localized in the brain or a specific portion of the brain. The technique (B) facilitates the comparison of mass spectrums obtained at different spatial areas of a sample. Therefore, this technique is convenient, for example, when the mass spectrums of the brain, nose, chin or other portions are to be compared.

The techniques (A) and (B) reveal the distribution of a substance but do not identify the localized substance. Therefore, although an operator can recognize a certain substance as the substance to be observed (which is hereinafter called the substance of interest) but cannot specifically discern the kind of the substance of interest. To identify the substance of interest, it is necessary to do a more complex procedure, for example as follows: After a portion where the substance of interest is present is located by technique (A), the operator specifies that portion by setting an ROI frame on an optical image or mapping image by technique (B), and enters a command to initiate an MS/MS analysis with the m/z value of the substance of interest as the precursor. Then, MS/MS spectrums obtained at a plurality of measurement points by the measurement are averaged to obtain an average MS/MS spectrum. Using the information of a peak or peaks appearing on this average mass spectrum, a commonly known database search is performed to identify the substance of interest.

The previously described procedure is troublesome and complex for an operator, and hence inefficient and time consuming. Furthermore, since the range specified by the ROI frame on the optical image or mapping image cannot be reduced to an adequately small size, the MS/MS spectrums used for the calculation of the average MS/MS spectrum inevitably include many peaks originating from unwanted substances other than the substance of interest. These noises deteriorate the S/N ratio of the MS/MS spectrums, making it difficult to improve the identification accuracy.

Patent Document 1: Japanese Unexamined Patent Application Publication No. 2006-284509
Patent Document 2: Specification of U.S. Pat. No. 5,808,300
Patent Document 3: Japanese Unexamined Patent Application Publication No. 2007-66533
Non-Patent Document 1: Kiyoshi OGAWA et al., "Kenbi Shitsuryou Bunseki Souchi No Kaihatsu (Research and Development of Mass Microscope)", *Shimadzu Hyouron* (*Shimadzu Review*), Shimadzu Corporation, published on Mar. 31, 2006, Vol. 62, Nos. 3 and 4, pp. 125-135
Non-Patent Document 2: Yasuhide NAITO, "Seitai Shiryou Wo Taishou Ni Shita Shitsuryou Kenbikyou (Mass Microprobe Aimed at Biological Samples)", J. Mass Spectrom., Soc. Jpn., Vol. 53, No. 3, 2005
Non-Patent Document 3: "msimaging BioMap", MS imaging, [search Jul. 3, 2008], Internet

DISCLOSURE OF THE INVENTION

Problem to be Solved by the Invention

The present invention has been developed to solve the previously described problems, and one objective thereof is to provide a mass spectrometer capable of efficiently identifying a localized substance of interest on a sample by a simple procedure. Another objective of the present invention is to provide a mass spectrometer in which the identification accuracy is enhanced by improving the S/N ratio of MS/MS spectrums used for the identification.

Means for Solving the Problems

The first aspect of the present invention aimed at solving the previously described problem is a mass spectrometer capable of an MS/MS analysis for each of a plurality of micro areas defined within a two-dimensional area on a sample, which is characterized by including:

a) an MS analysis conducting means for performing an MS analysis for each of the micro areas within a predetermined two-dimensional area on a sample to collect MS spectrum data;

b) a substance-of-interest selection means for allowing an operator to refer to the aforementioned MS data and select one or more substances of interest or m/z value thereof;

c) an MS/MS analysis conducting means for performing an MS/MS analysis using the m/z value of the selected one or more substances of interest as a precursor for each of the micro areas within the predetermined two-dimensional area, to collect MS/MS spectrum data;

d) an area extraction means for extracting, for each of the aforementioned one or more substances of interest, one or more micro areas in which the substance concerned is present, based on the MS spectrum data;

e) an average spectrum calculation means for selecting, from the aforementioned MS/MS spectrum data, the MS/MS spectrum data of the aforementioned one or more micro areas extracted by the area extraction means, and for calculating an average MS/MS spectrum for each substance of interest, using the selected MS/MS spectrum data; and f) an identification means for identifying each substance of interest by using the average MS/MS spectrum of the substance concerned.

The second aspect of the present invention aimed at solving the previously described problem is a mass spectrometer capable of an MS/MS analysis for each of a plurality of micro areas defined within a two-dimensional area on a sample, which is characterized by including:

a) an MS analysis conducting means for performing an MS analysis for each of the micro areas within a predetermined two-dimensional area on a sample to collect MS spectrum data;

b) a substance-of-interest selection means for allowing an operator to refer to the aforementioned MS data and select one or more substances of interest or m/z value thereof;

c) an area extraction means for extracting, for each of the aforementioned one or more substances of interest, one or more micro areas in which the substance concerned is present, based on the MS spectrum data;

d) an MS/MS analysis conducting means for performing an MS/MS analysis using the m/z value of the aforementioned one or more substances of interest as a precursor for each of the micro areas within the predetermined two-dimensional area extracted by the area extraction means, to collect MS/MS spectrum data;

e) an average spectrum calculation means for calculating an average MS/MS spectrum for each substance of interest, using the MS/MS spectrum data; and f) an identification means for identifying each substance of interest by using the average MS/MS spectrum of the substance concerned.

The mass spectrometers according to the first and second aspects of the present invention are the type of mass spectrometer generally referred to as an imaging mass spectrometer, microscopic mass spectrometer, or mass microscope or mass spectrometer image. The ion source used in the present mass spectrometer to ionizing a sample is typically a laser desorption ionization (LDI) source, represented by the matrix assisted laser desorption ionization (MAWI), but is not limited to this type. For the MS/MS analysis, an ion trap for dissociating ions by collision induced dissociation (CID) is typically provided, although the technique for ion dissociation is not limited to this type. In the mass analyzer section, a time-of-flight mass spectrometer (TOFMS) is often used since this device can achieve high levels of mass resolution, although this is not the only option.

In the mass spectrometers according to the first and second aspects of the present invention, the identification means may, for example, use a commonly known database search engine to compare peak information obtained from an average MS/MS spectrum with a database, and create as list of candidate substances that match the peak information. The search engine and database are appropriately selected depending on the substance in question.

Effects of the Invention

In one mode of the mass spectrometers according to the first and second aspects of the present invention, a distribution image drawing means for drawing an m/z distribution image showing the spatial distribution of a given m/z value or m/z range based on the MS spectrum data is provided so that the operator can use the m/z distribution image when selecting one or more substances of interest or m/z value thereof by means of the substance-of-interest selection means. In this case, while visually checking the m/z distribution image, the operator (user) can select a substance of interest having a unique spatial distribution on the sample or m/z value thereof. Then, based on the previously collected NS spectrum data, the area extraction means one or more micro areas in which the substance of interest is present.

In a preferable configuration of the present invention, the area extraction means determines that the substance of interest is present in a given micro area when the spectrum intensity at the m/z value of the substance of interest in the MS spectrum of the given micro area is equal to or higher than a predetermined threshold level. By this configuration, one or more micro areas where an amount of the substance of interest equal to or greater than a certain quantity is likely to exist can be extracted. Although the aforementioned threshold being used as the criteria for the spectrum intensity may be uniquely determined, it is more preferable to provide a means for allowing a user to appropriately set the threshold. This is because the number of micro areas to be extracted by the area extraction means changes depending on the threshold level; this number affects the S/N ratio of the average MS/MS spectrum to be obtained and hence the identification accuracy of the substance of interest.

In the mass spectrometer according to the first aspect of the present invention, the average spectrum calculation means calculates an average MS/MS spectrum using MS/MS spectrum data previously collected for each of the micro areas extracted in the previously described manner. On the other hand, in the mass spectrometer according to the first aspect of the present invention, the MS/MS analysis conducting means performs an MS/MS analysis for each of the micro areas extracted in the previously described manner, after which the average spectrum calculation means calculates an average MS/MS spectrum using all the MS/MS spectrum data obtained by the MS/MS analysis. Accordingly, the mass spectrometer according to the first aspect of the present invention performs MS/MS analysis on the micro areas that will not be reflected in the average MS/MS spectrum, whereas the mass spectrometer according to the second aspect of the present invention performs MS/MS analysis only on the micro areas that will be reflected in the average MS/MS spectrum.

In any of the mass spectrometers according to the first and second aspects of the present invention, a plurality of micro areas for calculating an average MS/MS spectrum can be set automatically or only by simple operations; the operator only needs to do extremely simple tasks to identify the substance of interest. Thus, the work efficiency is improved and the time required for the process is shortened. Since the average MS/MS spectrum is calculated using only the MS/MS spectrum data of the micro areas in which the substance of interest is present, the ions originating from the substance of interest appears with high intensities on the average MS/MS is increased, while the intensities of unwanted noised are lowered. Thus, the S/N ratio of the average MS/MS spectrum is improved, so that the substance of interest can be identified with higher levels of accuracy and reliability.

Furthermore, in the mass spectrometer according to the second aspect of the present invention, the number of MS/MS analyses to be performed is directly reduced since no MS/MS analysis is performed for the micro areas that will not be reflected in the average MS/MS spectrum of the substance of interest. This is advantageous for shortening the time from the initiation of the analysis to the completion of identification.

EXPLANATION OF NUMERALS

1 Air-Tight Chamber
2 Sample Stage
3 Sample
3*a* Laser Irradiation Point
4 Laser Irradiation Unit
5 Laser Beam
6 Lens
7 Ion Transport Tube
10 Vacuum Chamber
11 Ion lens
12 Ion Trap
13 TOFMS
14 Reflectron Electrode
15 Detector
20 A/D Converter
21 Data Processor
22 Data Memory
23 Controller
24 Stage Driver
25 Operation Unit
26 Display Unit
30 Guide

31 CCD Camera
32 Lens
33 Transmitting Illuminator
50 Optical Image
51 Mass Analysis Area
52 Micro Area
53 MS Spectrum
54*a*, 54*b* m/z Distribution Image

BEST MODE FOR CARRYING OUT THE INVENTION

The configuration and operation of an imaging mass spectrometer as one embodiment of the mass spectrometer according to the present invention is hereinafter described with reference to the attached drawings.

Figure 1:
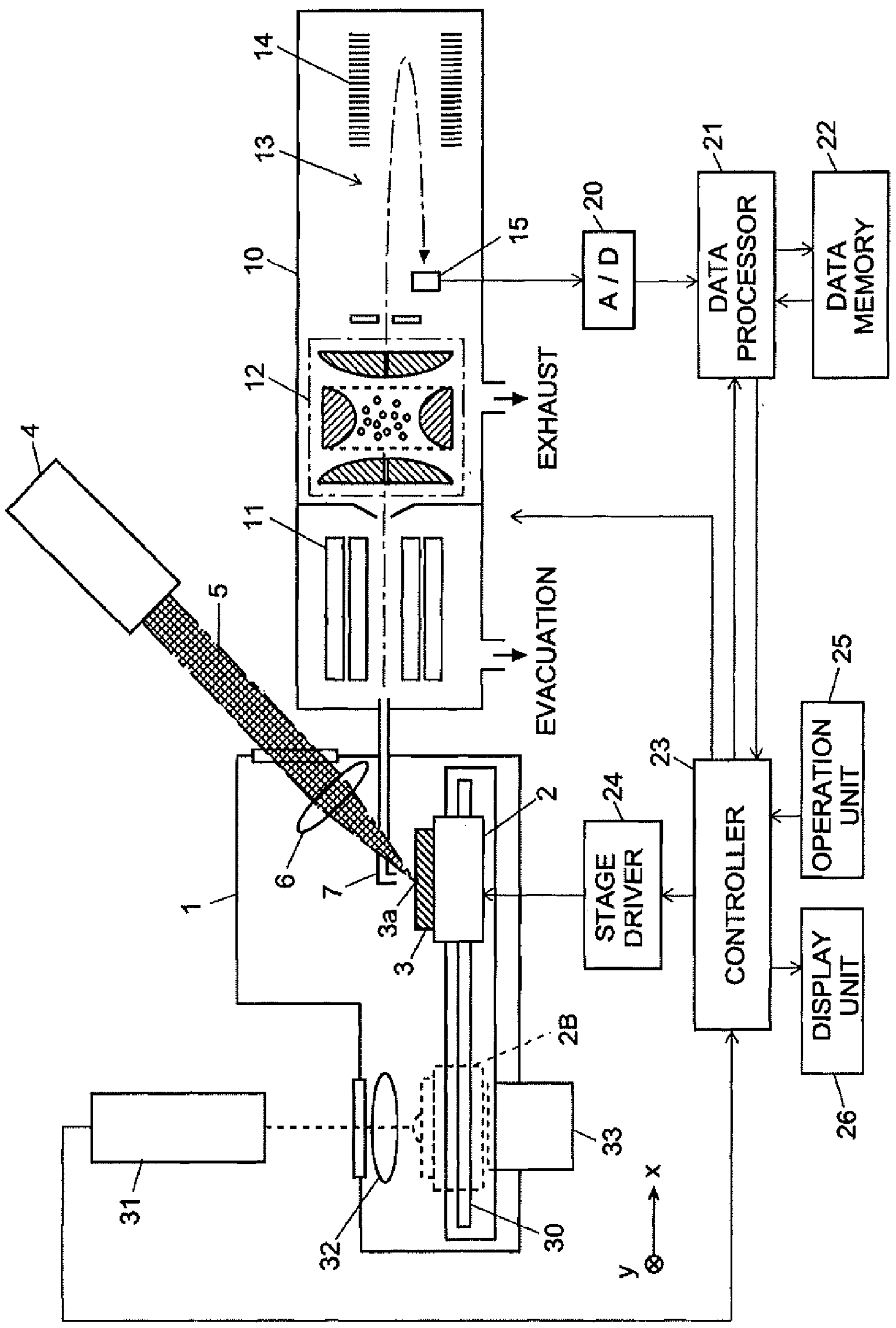
FIG. 1 is a configuration diagram of the main components of an imaging mass spectrometer according to one embodiment of the present invention.

FIG. 1 is a configuration diagram of the main components of the imaging mass spectrometer according to the present embodiment. This imaging mass spectrometer includes an air-tight chamber 1 maintained at approximately atmospheric pressure, in which an ionization unit for ionizing a sample by an atmospheric pressure MALDI (AP-MALDI) method and a microscopic observation unit for microscopically observing a sample are provided. A sample 3 is placed on a sample stage 2, which can be moved at least in two directions, i.e. the x-axis and y-axis directions, by a stage driver 24. When the sample stage 2 is at a position indicated by the solid line in FIG. 1, a laser beam 5, which is emitted from a laser irradiation unit 4 and focused by a lens 6, hits the upper surface of the sample 3. Due to this irradiation with the laser beam 5, ions originating from the sample generate from the portion around the laser irradiation point 3*a* on the sample 3.

The ions generated from the sample 3 in the air-tight chamber 1 are transported through an ion transport tube 7 into a vacuum chamber 10, which is evacuated by a vacuum pump (not shown). Within this vacuum chamber 10, the ions are converged by an ion lens 11 and sent into an ion trap 12 in the subsequent stage. The ion trap 12 has a three-dimensional quadrupole configuration consisting of a ring electrode and a pair of end cap electrodes. Within this ion trap 12, a quadrupole electric field is created, whereby ions are temporarily stored and held inside and then almost simultaneously ejected into a time-of-flight mass spectrometer (TOFMS) 13. The TOFMS 13 includes a reflectron electrode 14, which creates a direct-current electric field for reversing the flight direction of the ions. During this flight, the various kinds of ions, which have been almost simultaneously introduced into the TOFMS 13, are temporally separated according to their m/z value before arriving at the detector 15. The detector 15 produces a detection signal corresponding to the amount of ions that it has received.

After temporarily holding various kinds of ions inside, the ion trap 12 can select a kind of ion having a specific m/z value as a precursor ion, and this precursor ion can be dissociated by CID (collision induced dissociation). The product ions produced as a result of this dissociation process is temporarily held in the ion trap 12 and then simultaneously ejected toward the TOFMS 13, in which the ions are subjected to a mass analysis. Thus, an MS/MS analysis can be performed. It is also possible to perform an $MS^n$ analysis by repeating the selection and dissociation of ions within the ion trap 12 multiple times.

The sample stage 2 in the air-tight chamber 1 can be moved along the guide 30 extending to the x-axis direction, to a position 2B (observation position) indicated by the broken lines in FIG. 1. A CCD camera 31 is provided above the observation point 2B and outside the air-tight chamber 1, while a transmitting illuminator 33 is provided below the observation position 2B. When the sample stage 2 is at the observation position 2B, the light emitted from the transmitting illuminator 33 passes through an opening formed in the sample stage 2 and illuminates the lower surface of the sample 3. The transmitted light creates a sample image, which can be captured with the CCD camera 31 through a lens 32. The microscopic image taken with the CCD camera 31 can be displayed on the screen of a display unit 26 via a controller 23 (which will be described later). It is naturally possible to provide an additional illuminating system for reflection observation or fluorescent observation other than the transmission observation. It is also possible to provide a light microscope instead of the CCD camera 31 so that the operator can directly view the microscopic image.

The detection signals obtained by an MS analysis, MS/MS analysis or other types of analyses are converted into digital values by an A/D converter 20 and fed to a data processor 21. The data processor 21 converts a time-of-flight spectrum, which shows the relationship between the signal intensity and the time of flight measured from the point in time when the ions are ejected from the ion trap 12, into an MS spectrum or MS/MS spectrum and stores the obtained spectrum in a data memory 22. The data processor 21 also performs a data processing as will be described later, using the spectrum data stored in the data memory 22, to eventually identify the substance present on the sample and display the result of identification on the screen of the display unit 26 via the controller 23.

The controller 23 controls a stage driver 24 and other elements to conduct a mass-analyzing operation on the sample 3 and display microscopic observation images or analysis results on the display unit 26. (For the sake of simplicity, the control signal lines necessary for the aforementioned operation are omitted in FIG. 1.) The operation unit 25 includes a keyboard, pointing device and other elements. This unit is used to set the values of various parameters and enter various commands.

The controller 23 and the data processor 21 can be constructed, for example, in the form of a multi-purpose personal computer as hardware resources with dedicated controlling/processing software applications installed therein. In this case, the functions for various controlling and data-processing operations are realized by running the programs on the computer.

Figure 2:
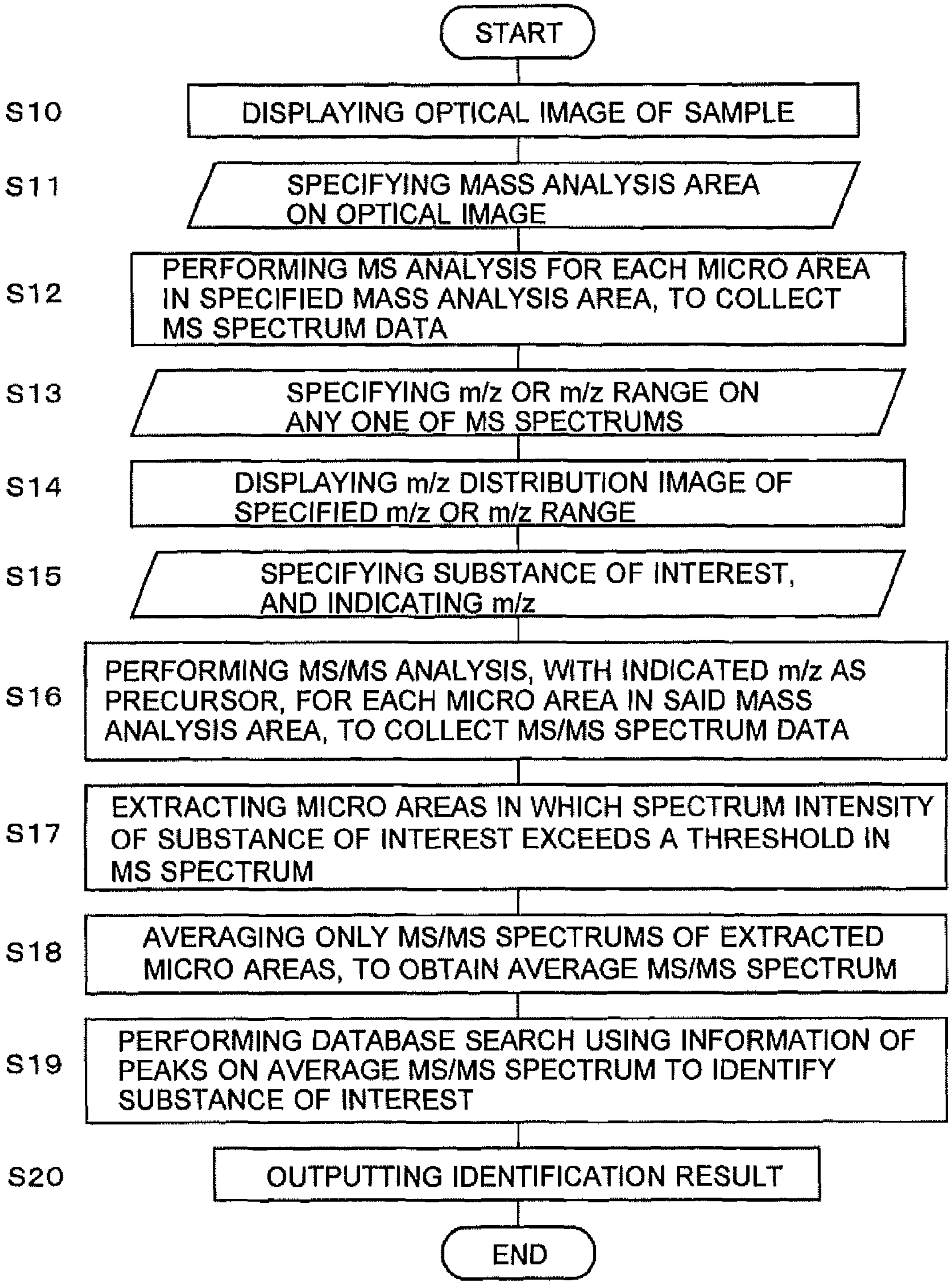
FIG. 2 is a flowchart showing the steps of an analyzing operation by the imaging mass spectrometer of the present embodiment.
Figure 3:
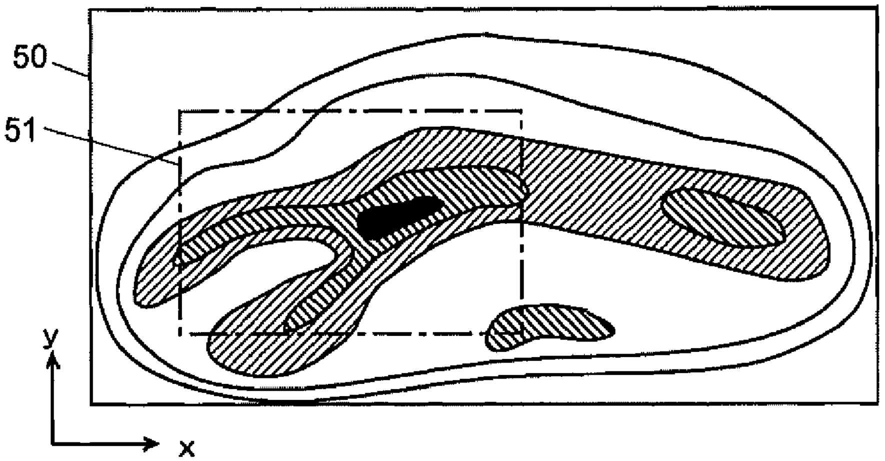
FIG. 3 is a schematic diagram showing a portion of an image displayed in the analyzing operation shown in FIG. 2.
Figure 4:
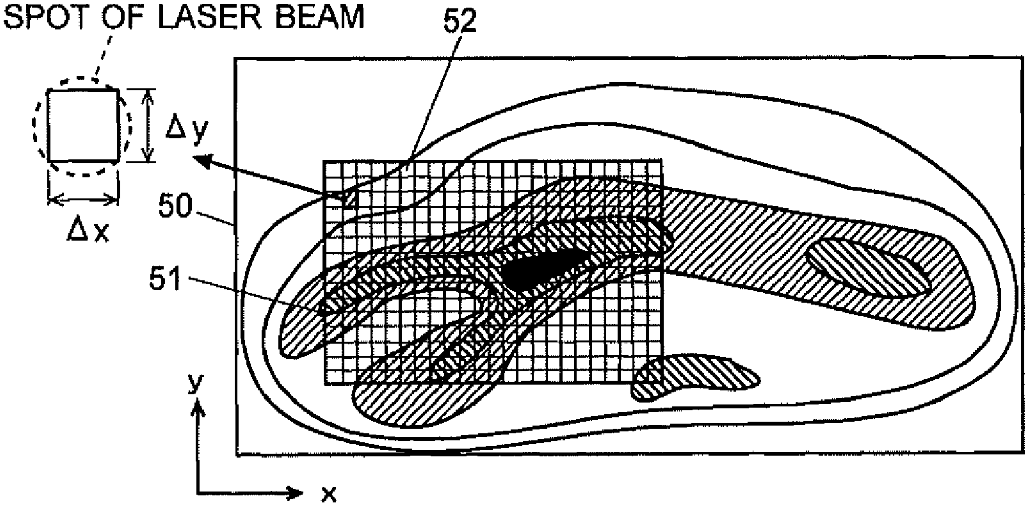
FIG. 4 is a schematic diagram showing a portion of another image displayed in the analyzing operation shown in FIG. 2.
Figure 5:
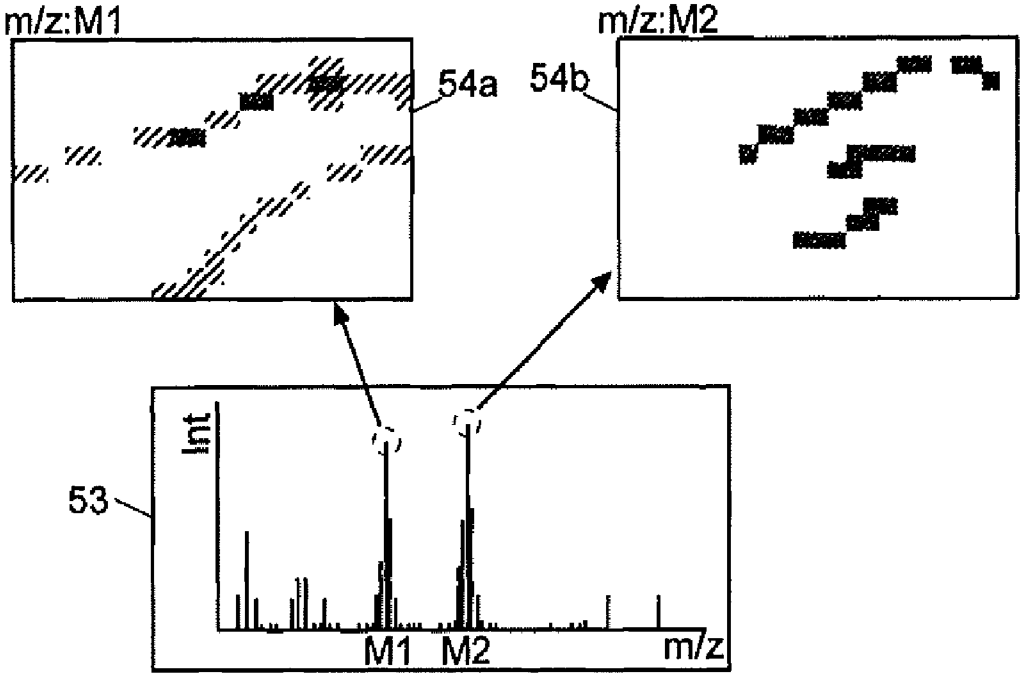
FIG. 5 is a schematic diagram showing a portion of still another image displayed in the analyzing operation shown in FIG. 2.

The analysis operation characteristic of the imaging mass spectrometer of the present embodiment is hereinafter described with reference to FIGS. 2-5. FIG. 2 is a flowchart showing the steps of the present analysis operation, and FIGS. 3-5 are schematic diagrams each showing a portion of an image shown on the display unit 26 during the analysis operation.

After a sample 3 to be analyzed, which originates from a living body, is placed on the sample stage 2, an operator enters an analysis-initiation command through the operation unit 25. Then, under the control of the controller 23, optical imaging of the sample 3 is performed with the CCD camera 31, and an enlarged image of the surface of the sample 3 is shown on the screen of the display unit 26 (Step S10). The operator visually checks this optical image and manipulates the operation unit 25 to specify a region of interest as the mass analysis range (Step S11). In the present example, as shown in FIG. 3, it is assumed that the operator has specified a rectangular mass analysis area 51 on the displayed optical image 50 of the sample. It should be noted that the mass analysis range does not need to be rectangular; the range can be specified in any shape.

After the mass analysis area 51 is specified, the controller 23 conducts an MS analysis for each of the micro areas within the specified mass analysis area 51 (Step S12). More specifically, as shown in FIG. 4, the specified two-dimensional mass analysis area 51 is divided into micro areas 52 arrayed along two axial directions (i.e. the x and y directions), each micro area measuring Δx in width and Δy in height, and a set of MS spectrum data representing the relationship between m/z and the signal intensity is obtained for each micro area 52. Every time the sample stage 2 is moved in the x-axis or y-axis direction by the stage driver 24 by a predetermined step of distance (Δx or Δy), a laser beam 5 is cast onto the sample 3, whereby ions are generated from the laser irradiation point on the sample 3 (this point is actually a roughly circular area, as shown in FIG. 4), and the generated ions are subjected to mass analysis.

If it is unlikely that an adequate amount of ions are produced by a single shot of laser irradiation, a short-time laser irradiation may be repeated on the same micro areas 52, in which case the produced ions are accumulated in the ion trap 12 for every shot of the laser beam, after which the accumulated ions are sent to the TOFMS 13 for mass analysis. In this manner, a set of MS spectrum data reflecting the substances present in each of the large number of micro area 52 is obtained for each micro area 52. The obtained data are stored in the data memory 22.

Next, the operator specifies a point within the previously specified mass analysis area 51. Then, the data processor 21 reads the MS spectrum data corresponding to the specified point (micro area) from the data memory 22, and displays an MS spectrum on the screen of the display unit 26. The operator visually checks this MS spectrum and selects an appropriate m/z ratio or m/z range (Step S13). In response to this operation, the data processor 21 extracts the spectrum intensity corresponding to the specified m/z ratio or m/z range, creates an m/z distribution (mapping) image showing the intensity values by a specific color pattern, and displays this image on the screen of the display unit 26 (Step S14). For example, as shown in FIG. 5, when the operator selects a specific peak on the displayed MS spectrum 53, an m/z distribution image 54*a* or 54*b* corresponding to the selected peak is drawn on the screen. In this manner, every time an m/z ratio or m/z range is selected on the MS spectrum by the operator, a distribution image corresponding to each different m/z ratio or m/z range is created.

The operator visually checks the m/z distribution image, locates m/z of the substance of interest, and indicates it through the operation unit 25 (Step S15). That is to say, watching the m/z distribution image as shown in FIG. 5, the operator selects, as the substance of interest, a substance localized on a region of interest of the sample, and indicates the m/z ratio of that substance. For example, if a substance shown on the m/z distribution image 54*b* is determined to be the substance of interest, the operator indicates m/z=M2. In this operation, it is not necessary to limit the substance of interest to one substance; indicating two or more substances is also possible.

When m/z of the substance of interest is indicated by the operator, the controller 23 operates the components concerned so as to perform an MS/MS analysis, with the m/z set as a precursor ion, for each micro area 52 within the mass analysis area 51 on which the MS analysis was performed in Step S12. Concurrently, the data processor 21 collects MS/MS spectrum data for each micro area 52 and stores them in the data memory (Step S16). If the m/z ratios of two or more substances are specified, it is necessary to repeat an MS/MS analysis for each substance, with each m/z ratio set as the precursor ion. Accordingly, the MS/MS analysis requires a longer period of time.

Next, the data processor 21 extracts micro areas having a spectrum intensity at the m/z ratio of the substance of interest higher than a threshold level, from the MS spectrum data of each micro area collected in Step S12 (Step S17). The threshold used as the determination criterion may be a value specified by the operator through the operation unit 25 or a predetermined default value. Every micro area extracted in this step must have a set of MS/MS spectrum data collected. Accordingly, the data processor 21 reads the MS/MS spectrum data of the extracted micro areas from the data memory 22 and calculates an average of the spectrum intensity values for each m/z ratio to create an average MS/MS spectrum (Step S18). This is the average MS/MS spectrum for the substance of interest. If there are two or more substances of interest, the process of Steps S17 and S18 is performed for each substance of interest. Therefore, as many average MS/MS spectrums as the substances of interest will be created.

Subsequently, information about the peaks on the average MS/MS spectrum (e.g. the m/z ratio, spectrum intensity and so on) is collected, and this peak information is compared with an existing database to find a substance that matches the peak information. Thus, the substance of interest is identified (Step S19). For example, when the substance of interest is a protein, a database search engine called "MASCOT", which is marketed by Matrix Science Ltd., can be used to deduce the amino acid sequence and identify the protein. When the substance of interest is a lipid, a search tool called "Lipid Search", which has been developed by the University of Tokyo, is available. In the former example, an MS/MS ion-search function of MASCOT can be used, in which case the system searches an amino acid sequence identification database for proteins or peptides that match the specified conditions, and outputs a search result accompanied by the scores indicating the reliability of matching. Based on this result, a group of proteins or peptides that have scored higher than a certain level are sorted in descending order of the score and shown as the result of identification on the display unit 26 (Step S20).

Thus, the imaging mass spectrometer of the present embodiment can continuously and automatically perform necessary operations to identify the substance of interest after checking the distribution of the substance of interest among various kinds of substances present in an arbitrary two-dimensional area on a sample. Therefore, for example, a substance that is locally found in a specific portion of a living tissue can be identified with a high level of throughput.

Figure 6:
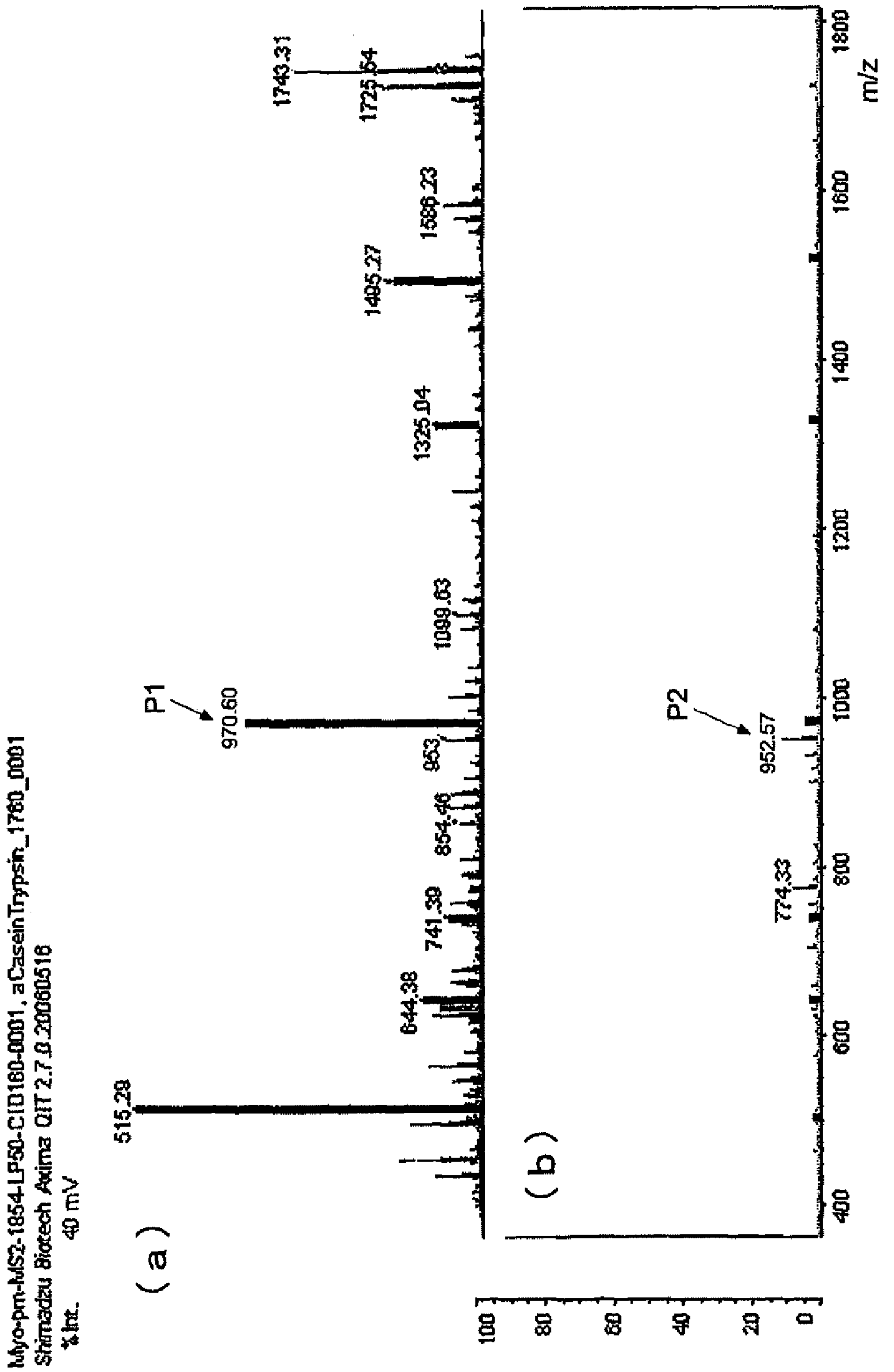
FIG. 6 shows examples of MS/MS spectrums obtained by an actual measurement, where (a) is an MS/MS spectrum obtained when an ion having a high spectrum intensity was set as a precursor, and (b) is an MS/MS spectrum obtained when an ion having a low spectrum intensity was set as a precursor.

FIG. 6 shows MS/MS spectrums obtained by an actual measurement performed for confirming the effect of the process of Steps S17 and S18. Specifically, FIG. 6(*a*) is an MS/MS spectrum obtained by an MS/MS analysis in which an ion having a high spectrum intensity in an MS spectrum was used as a precursor, and FIG. 6(*b*) is an MS/MS spectrum obtained by an MS/MS analysis in which an ion having a low spectrum intensity in an MS spectrum was used as a precursor. In both spectrums, the thick lines indicate the peaks of the product ions originating from the substance of interest. Comparing (a) and (b) clearly shows that the product ions originating from the substance of interest in (a) have relatively high intensities, whereas the product ions originating from the substance of interest in (b) have rather low intensities and are exceeded by some of the other peaks. If a large number of MS/MS spectrums of this type are used to compute an average MS/MS spectrum, the intensity of a product-ion peak originating from the substance of interest (e.g. the peak P1 in FIG. 6) will be low, while another ion peak that is not related to the substance of interest and hence regarded as a noise (e.g. the peak P2 in FIG. 6) will have a higher intensity. Thus, the average MS/MS spectrum will have a low S/N ratio.

On the other hand, in the process of Steps S17 and S18, the average MS/MS spectrum is calculated without using the MS/MS spectrums of the micro areas in which no substance of interest is present or only a small amount thereof is present. That is to say, MS/MS spectrums similar to FIG. 6(*a*) will be used to calculate an average MS/MS spectrum, while MS/MS spectrums similar to FIG. 6(*b*) will be excluded from that calculation. Therefore, in the resulting average MS/MS spectrum, the intensities of the ion peaks originating from the substance of interest will be higher, while those of the ion peaks regarded as noises will be lower. Thus, the S/N ratio of the average MS/MS spectrum is improved, whereby the accuracy of identification of the substance of interest based on the average MS/MS spectrum is enhanced.

Figure 7:
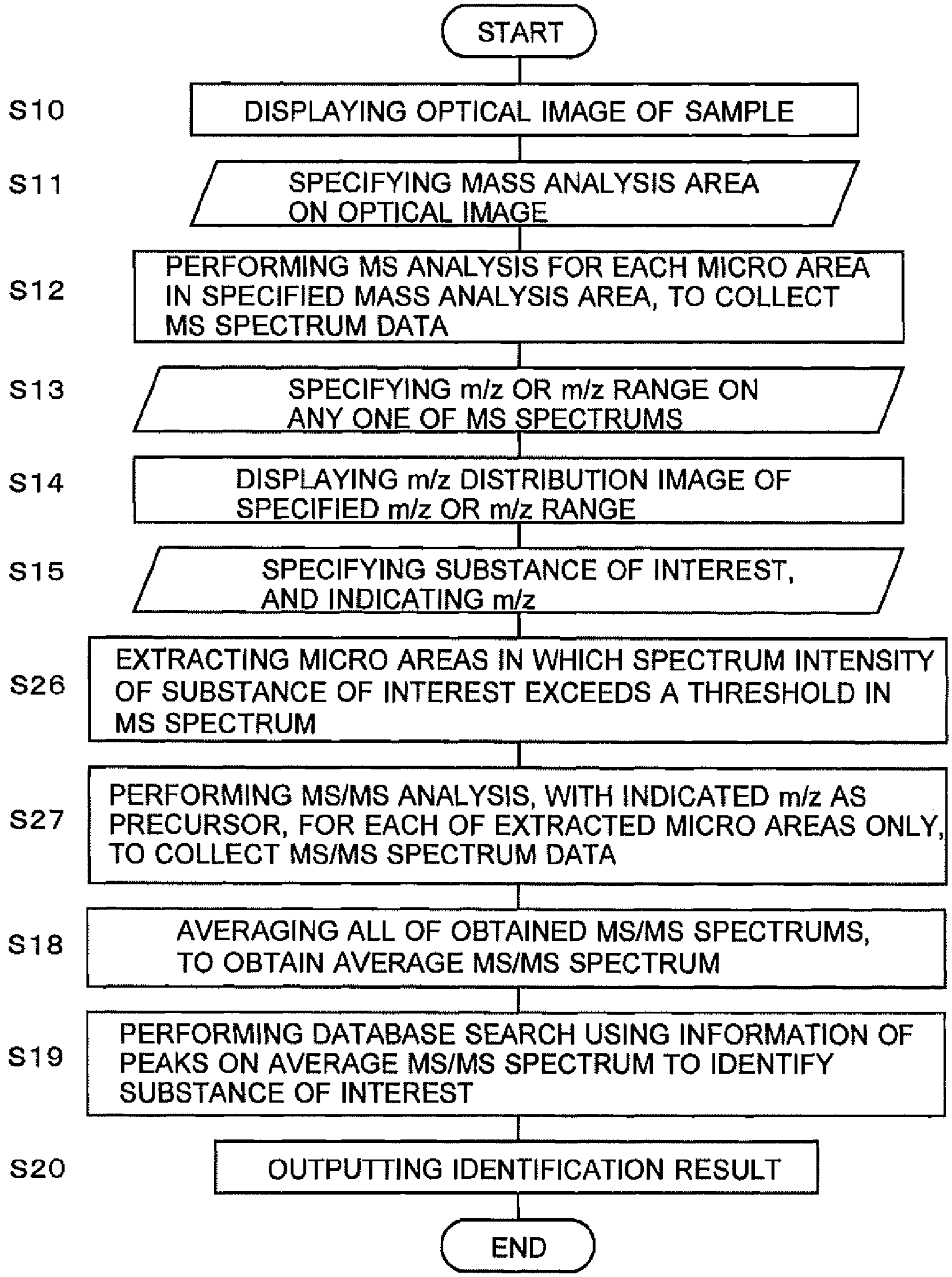
FIG. 7 is a flowchart showing the steps of an analyzing operation by an imaging mass spectrometer according to another embodiment.

In the data processing of the previous embodiment, the calculation of the average MS/MS spectrum in Step S18 uses only the MS/MS spectrum data of the micro areas extracted in Step S17. Accordingly, there exists a considerable amount of MS/MS spectrum data that are collected but not used. This means that some of the MS/MS analyses are actually unnecessary, and there is some room for reducing the processing time. This point is improved in the flowchart shown in FIG. 7. The process steps of this flowchart are identical to those of the flowchart in FIG. 2 except that Steps S16-S18 are replaced by Steps S26-S28.

More specifically, before the MS/MS analysis, the micro areas in which the substance of interest is present by an amount greater than a certain level are located by performing the process of Step S26, which is basically the same as Step S17. Subsequently, the MS/MS analysis using the m/z ratio of the substance of interest as the precursor is performed for only the micro areas that have been selected as the areas in which the substance of interest is present, not for the entire mass analysis area 51, to collect MS/MS spectrum data (Step S27). Since this MS/MS analysis is performed on the micro areas in which the substance of interest originally exists by an amount greater than a certain level, it is more probable that the product-ion peaks originating from the substance of interest have high spectrum intensities in the obtained MS/MS spectrum, as shown in FIG. 6(*a*). Then, an average spectrum is calculated by averaging all the obtained MS/MS spectrums (Step S28).

The present method generally reduces the number of MS/MS analyses to a level significantly lower than the process of the previous embodiment, and hence is effective in reducing the processing time. The average MS/MS spectrum has an improved S/N ratio concerning the product ions originating from the substance of interest since no MS/MS spectrums having relatively large noise components as shown in FIG. 6(*b*) are reflected in the average MS/MS spectrum. As a result, the identification accuracy of the substance of interest in Step S19 is improved.

In the previous embodiment, when the substance of interest is specified in Steps S13-S15, only one distribution image of a specific m/z ratio or m/z range is shown at one time, based on which an operator determines whether it is the substance of interest or not. Alternatively, it is possible to apply the technique of multivariable analysis, such as the principal component analysis, on the MS spectrum data and display the analysis result so that the operator can simultaneously specify two or more substances of interest by using the displayed result.

A concrete example is hereinafter briefly explained: For example, a principal component analysis (PCA), which is a type of multivariable analysis, is carried out using MS spectrum data obtained for each micro area as multivariable input values. A principal component analysis is a technique in which a number of variables are represented by a smaller number of indices. A detailed description of this technique is available in many documents and books, such as Yoshikatsu Miyashita and Shin-ichi Sasaki "Chemometrics", published by KYORITSU SHUPPAN CO., LTD, 1995. Furthermore, there are various kinds of software applications for performing calculations of the principal component analysis on a personal computer or workstation.

In the principal component analysis, it is possible to calculate a score and a loading; the score indicates the relationship between the micro areas, while the loading indicates the correlation between the variables (i.e. the MS peaks). The loading values can be plotted on a graph having the principal components assigned on the axes. Thus graph, which is called a loading plot, helps the operator to extract the mass peaks characteristically distributed in the micro areas included in the mass analysis area and simultaneously locate two or more substances of interest. Thus, the analysis time can be reduced and yet the analysis reliability is improved. For example, the accuracy of protein identification is expected to be improved by locating a plurality of substances (peptides) that are present only in the cancer cells of a sample digested by an enzyme, calculating the average MS/MS spectrum of each peptide, and identifying a protein that can be commonly identified from all of the obtained average MS/MS spectrums.

It should be noted that the previous embodiment is a mere example of the present invention. It is evident that any change, modification or addition appropriately made within the spirit of the present invention will be obviously included within the scope of claims of this patent application.

The invention claimed is:

1. A mass spectrometer capable of an MS/MS analysis for each of a plurality of micro areas defined within a two-dimensional area on a sample, which is characterized by comprising:

a) an MS analysis conducting means for performing an MS analysis for each of the micro areas within a predetermined two-dimensional area on a sample to collect MS spectrum data;

b) a substance-of-interest selection means for allowing an operator to refer to the aforementioned MS data and select one or more substances of interest or m/z value thereof;

c) an MS/MS analysis conducting means for performing an MS/MS analysis using the m/z value of the selected one or more substances of interest as a precursor for each of the micro areas within the predetermined two-dimensional area, to collect MS/MS spectrum data;

d) an area extraction means for extracting, for each of the aforementioned one or more substances of interest, one or more micro areas in which the substance concerned is present, based on the MS spectrum data;

e) an average spectrum calculation means for selecting, from the aforementioned MS/MS spectrum data, the MS/MS spectrum data of the aforementioned one or more micro areas extracted by the area extraction means, and for calculating an average MS/MS spectrum for each substance of interest, using the selected MS/MS spectrum data; and f) an identification means for identifying each substance of interest by using the average MS/MS spectrum of the substance concerned.

2. A mass spectrometer capable of an MS/MS analysis for each of a plurality of micro areas defined within a two-dimensional area on a sample, which is characterized by comprising:

a) an MS analysis conducting means for performing an MS analysis for each of the micro areas within a predetermined two-dimensional area on a sample to collect MS spectrum data;

b) a substance-of-interest selection means for allowing an operator to refer to the aforementioned MS data and select one or more substances of interest or m/z value thereof;

c) an area extraction means for extracting, for each of the aforementioned one or more substances of interest, one or more micro areas in which the substance concerned is present, based on the MS spectrum data;

d) an MS/MS analysis conducting means for performing an MS/MS analysis using the m/z value of the aforementioned one or more substances of interest as a precursor for each of the micro areas within the predetermined two-dimensional area extracted by the area extraction means, to collect MS/MS spectrum data;

e) an average spectrum calculation means for calculating an average MS/MS spectrum for each substance of interest, using the MS/MS spectrum data; and f) an identification means for identifying each substance of interest by using the average MS/MS spectrum of the substance concerned.

3. The mass spectrometer according to claim 1, which is characterized in that the area extraction means determines that the substance of interest is present in a given micro area when a spectrum intensity at the m/z value of the substance of interest in the MS spectrum of the given micro area is equal to or higher than a predetermined threshold level.

4. The mass spectrometer according to claim 1, which is characterized in that a distribution image drawing means for drawing an m/z distribution image showing the spatial distribution of a given m/z value or m/z range based on the MS spectrum data is provided so that the operator can use the m/z distribution image when selecting one or more substances of interest or m/z value thereof by means of the substance-of-interest selection means.

5. The mass spectrometer according to claim 2, which is characterized in that the area extraction means determines that the substance of interest is present in a given micro area when a spectrum intensity at the m/z value of the substance of interest in the MS spectrum of the given micro area is equal to or higher than a predetermined threshold level.

6. The mass spectrometer according to claim 2, which is characterized in that a distribution image drawing means for drawing an m/z distribution image showing the spatial distribution of a given m/z value or m/z range based on the MS spectrum data is provided so that the operator can use the m/z distribution image when selecting one or more substances of interest or m/z value thereof by means of the substance-of-interest selection means.

* * * * *